United States Patent [19]

Kesselman et al.

[11] Patent Number: 4,949,929
[45] Date of Patent: Aug. 21, 1990

[54] ADJUSTABLE L-SHAPED MOUNTING BRACKET

[76] Inventors: Marcia E. Kesselman; Robert S. Feingold, both of 300 E. 59th St., Apt. 1204, New York, N.Y. 10022

[21] Appl. No.: 329,025

[22] Filed: Mar. 27, 1989

[51] Int. Cl.$^5$ ............................................. A47F 5/00
[52] U.S. Cl. ................................. 248/300; 248/220.1; 248/244
[58] Field of Search ..................... 248/300, 220.1, 244, 248/295.1, 298; 52/36; 312/245, 257 R, 257 SK; 211/88; 108/108, 106

[56] References Cited

U.S. PATENT DOCUMENTS

| | | | |
|---|---|---|---|
| 3,749,465 | 7/1973 | Newcomer | 312/245 |
| 4,179,091 | 12/1979 | Bidney | 248/295.1 X |
| 4,463,510 | 8/1984 | Windish | 248/300 X |
| 4,690,359 | 9/1987 | Phillips | 248/300 |
| 4,817,906 | 4/1989 | Ellison | 248/542 |

OTHER PUBLICATIONS

PCT Publication No. WO85/01423 of Apr. 1985.
1985 Sweet's Catalog File, Products for General Building and Renovation, p.22 (McGraw Hill).

*Primary Examiner*—Ramon O. Ramirez
*Attorney, Agent, or Firm*—Frederick J. Dorchak

[57] ABSTRACT

One embodiment is an L-shaped bracket which is a one-piece device formed from sheet metal and having two flat plate portions which are perpendicular to each other and meet at a juncture line. Each plate portion, secured to a panel, has an elongated through-hole with the hole in one plate portion being perpendicular to the juncture line, i.e., vertical; and the hole in the other plate portion being parallel to the juncture line. Screws, or other fastening means, extend through the elongated holes and the bracket and panel are adjusted along the length of the elongated holes and then the screws, or other fastener means, are fully tightened down to hold the bracket and panel in their adjusted positions. In another embodiment the bracket is F-shaped to grasp a panel between parallel plate portions.

5 Claims, 5 Drawing Sheets

ADJUSTABLE L-SHAPED MOUNTING BRACKET

BACKGROUND OF THE INVENTION

The present invention relates to hardware and more particularly to L-shaped and F-shaped brackets used to mount panels, such as cabinet panels.

DESCRIPTION OF THE RELATED ART

At the present time there are a large variety of commercially available brackets which may be used as support brackets. For example, one type of L-shaped bracket is formed from steel sheet metal and consists of a narrow strip having holes for screws in each of its perpendicular arms. However, there is still a need for a bracket which may be used by amateurs and which permits adjustments.

OBJECTIVES AND FEATURES OF THE INVENTION

It is an objective of the present invention to provide L-shaped and F-shaped brackets which permit two-way adjustment, so that they may be used by amateurs, for example, to construct cabinets, install closet shelves, and secure book shelves.

It is a further objective of the present invention to provide such a bracket which may be formed of an inexpensive material, such as sheet metal, and yet will provide a secure support.

It is a further feature of the present invention to provide such a bracket which may be used with the "32 mm" system of cabinet construction.

It is a further objective of the present invention to provide such a bracket which permits the person installing a panel, even if not skilled, to obtain a plumb, level or squared relationship of one panel to another.

It is a further objective of the present invention to provide such a bracket which permits adjustment of one panel to another without removal of the objects installed on the panel.

It is a further objective of the present invention to provide such a bracket which may be fastened to various types of walls including sheet rock, plaster, concrete, wood, plastic, brick and glass.

It is a further objective of the present invention to provide such a bracket which is especially designed for use in constructing closet systems, cabinet systems, wall systems and furniture.

It is a feature of the present invention to provide an L-shaped support bracket formed as a one-piece unitary member. The bracket has a first plate which is rectangular in shape and has at least one elongated hole therethrough. For example, the first plate portion may be fastened to a wall. A second plate portion, also rectangular in shape, has a juncture line with the first plate portion. The second plate portion has at least one elongated hole therethrough which is perpendicular to the first plate portion and is adapted to support a panel member, for example, a partition.

The direction of elongation of the hole in the first plate portion is parallel to the juncture line and the direction of elongation of the hole in the second plate portion is perpendicular to the juncture line. The elongated holes are adapted to have fastening means extending therethrough, permitting the bracket to move relative to the fastening means, for adjustment of the bracket and panel, before the fastening means is fully tightened.

It is a further feature of the present invention to provide the second plate portion with a second elongated hole which is parallel to the other elongated hole of the second plate portion. Preferably the first and second plate portions are the same size and shape as each other, the ratio of length to width of the elongated holes is in the range of 3:1 and 10:1, and the bracket is of sheet metal.

In another embodiment, it is a feature that another plate, parallel to the second plate, forms a space within which a panel is secured.

SUMMARY OF THE INVENTION

An "L" or "F" shaped bracket is provided which preferably is formed from sheet metal. The bracket has, in its L-shape, two plate portions which are perpendicular to each other. Each plate portion has at least one elongated slot and preferably one plate portion has two parallel slots. The slots permit a user, for example, an amateur installing a "32 mm" closet system, to install the brackets using untightened which they are connected, and then tighten down the fasteners.

BRIEF DESCRIPTION OF THE DRAWINGS

Other objectives and features of the present invention will be apparent from the following description, taken in conjunction with accompanying drawings. In the drawings.

DETAILED DESCRIPTION

Figure 1:
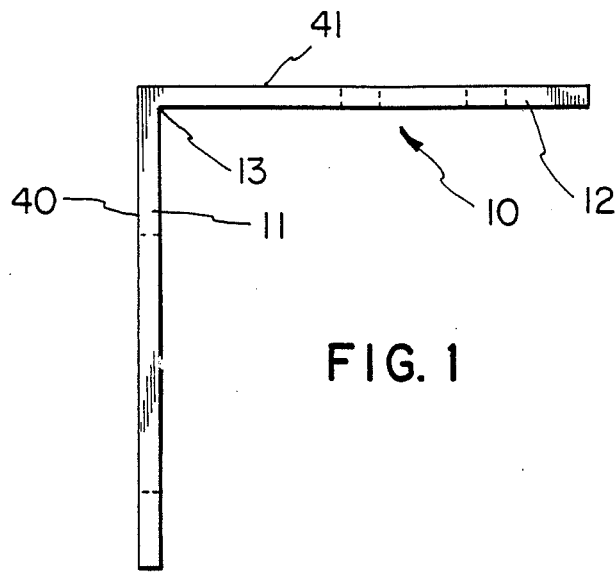
FIG. 1 is a side plan view of the first embodiment of the present invention.
Figure 2:
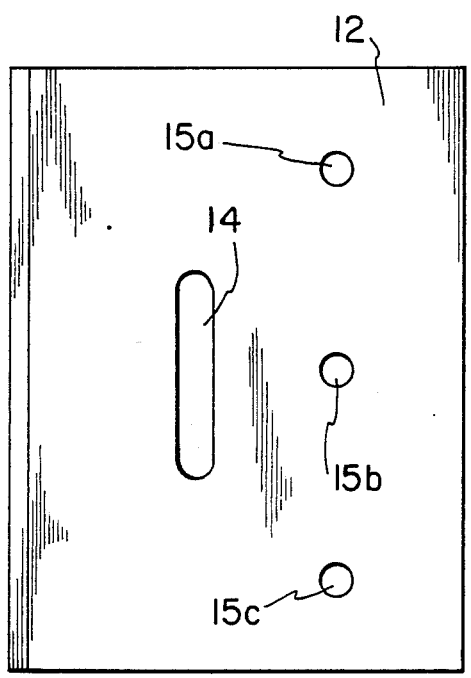
FIG. 2 is a front elevation view of the embodiment of FIG. 1 looking in the direction of arrow A of FIG. 1.
Figure 3:
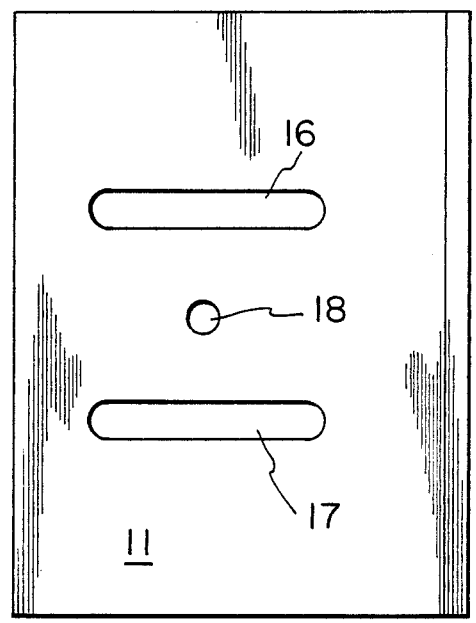
FIG. 3 is a top elevation view of the embodiment of FIG. 1 looking in the direction of arrow B of FIG. 1.
Figure 4:
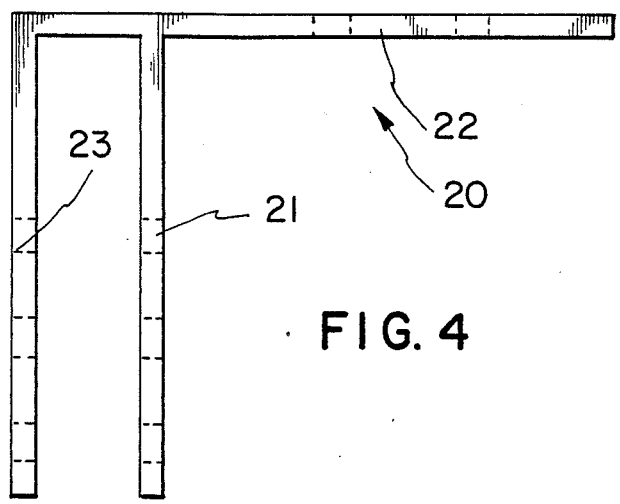
FIG. 4 a side plan view of the second embodiment of the present invention.

The bracket of the present invention is formed as a one-piece unitary member preferably formed by bending die stamped sheet metal steel of 8±gauge. Alternatively, the plate members may be joined by welding or the bracket may be formed from aluminum or suitable engineering plastic. The bracket may be plated, for example, chrome-plated, or may be painted.

The bracket 10 of the first embodiment ("Style I") is shown in FIGS. 1–3 and 8 and consists of a first rectangular plate portion 12 and a second rectangular plate portion 11 perpendicular thereto, which plate portions are joined at juncture line 13. The first plate portion 12 has an elongated through-hole slot 14, for example, 32 mm in length and 6 mm in width, and three round through-holes 15a–15c. The second plate portion 11 has two elongated slot through-holes 16 and 17 and a round through-hole 18. The direction of elongation of through-hole slot 14 in the first plate portion 12 is preferably parallel to juncture line 13 and the direction of elongation of through-hole slots 16 and 17 is preferably perpendicular to juncture line 13. Through-hole slots 16 and 7 are preferably aligned parallel to each other. Typical and preferred dimensions: length of plates 11 and 12 along lengths L and L' is 75 mm; width of plates 11 and 12 along width W is also 75 mm; length of slots 16 and 17 is 40 mm and they are separated along their imaginary mid-lines by 32 mm; the imaginary centers of the holes 15a–15c are separated by 12 mm.

Figure 5:
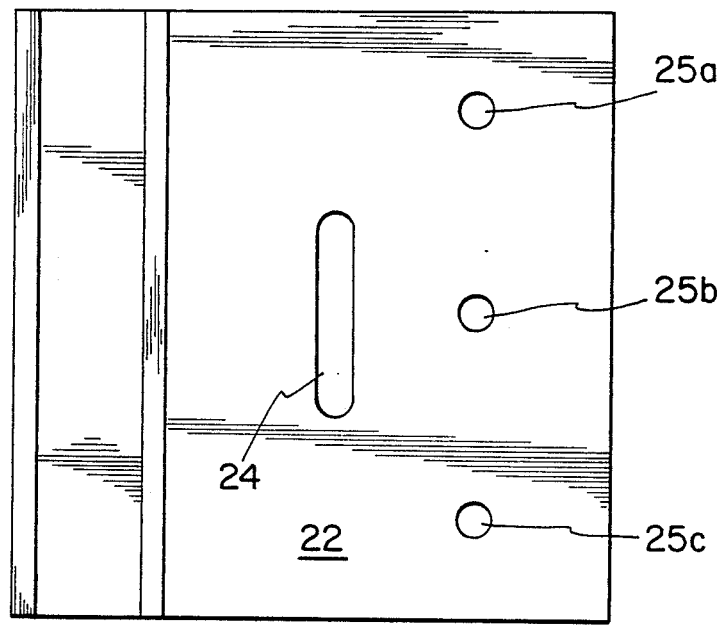
Figure 5 is a bottom elevation view of the second embodiment of FIG. 4 looking in the direction of arrow D of FIG. 4.
Figure 6:
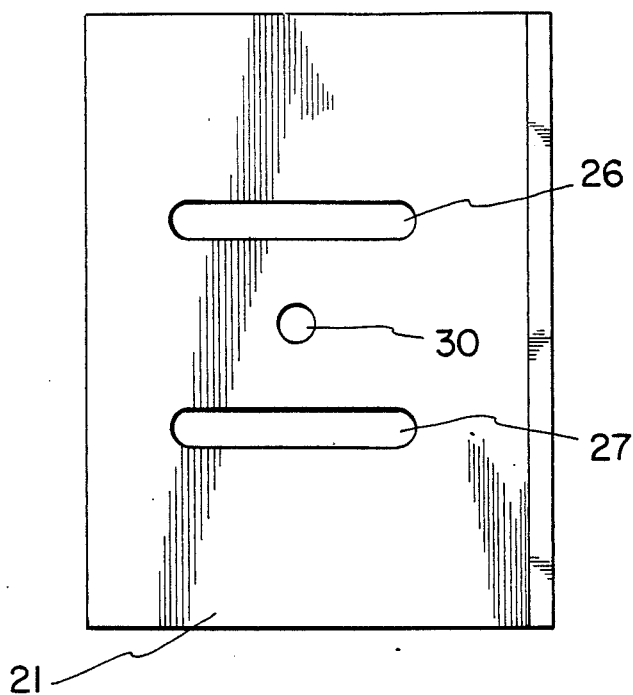
FIG. 6 a front elevation view of the embodiment of FIG. 4 looking in the direction of arrow E of FIG. 4.
Figure 7:
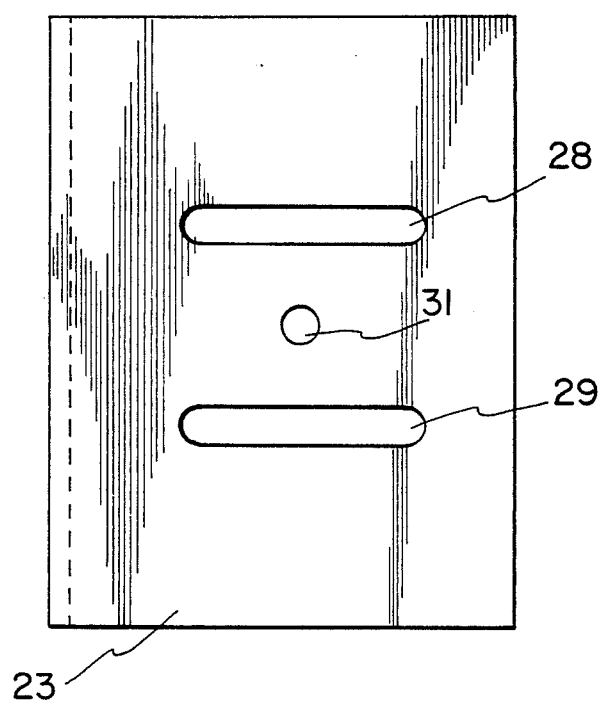
FIG. 7 is a back elevation view of the embodiment of FIG. 4 looking in the direction of arrow F of FIG. 4.
Figure 8:
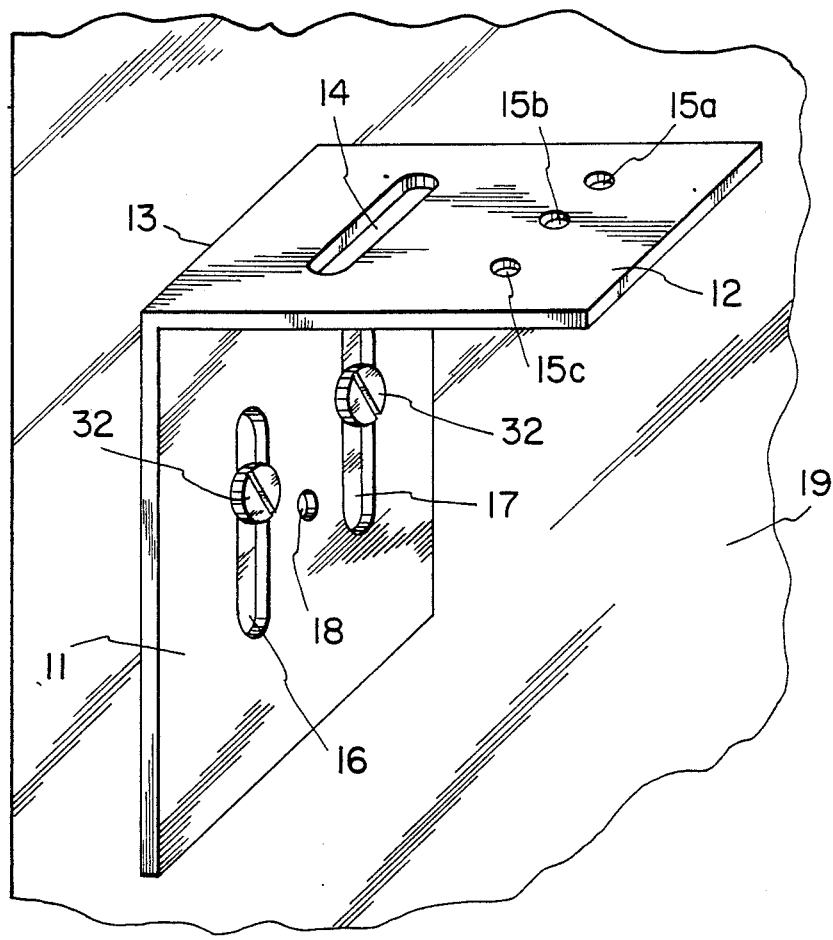
FIG. 8 is a perspective view of the first embodiment shown in FIGS. 1–3.

The bracket 20 of the second embodiment is shown in FIGS. 4–7 and comprises a first rectangular plate portion 1, a second rectangular plate portion 23 parallel thereto, and a third rectangular plate portion 22 perpendicular to and having juncture lines with the first and second plate portions 1, 23. As shown in FIG. 5, the plate portion 22 has an elongated slot through-hole 24 and three round holes 25a–25c. As shown in FIGS. 6 and 7, the plate portions 21, 23 have pairs of elongated slot through-holes 26,27 and 28, 29 respectively, preferably aligned parallel to each other, and therebetween round holes 30,31 respectively. The direction of elongation of through-hole slots 26,27 and 28,29 in plate portions 21 and 23 respectively is preferably perpendicular to the juncture lines with plate portion 22. The direction of elongation of through-hole slot 24 is preferably parallel to the juncture lines with plate portions 21 and 23. Typical and preferred dimensions are: length L" is 98 mm; width W" is 96 mm and height H" is 75 mm; the slots (at their imaginary axes) are spaced 32 mm apart.

In both embodiments the ratio of length-to-width of the elongated slots is in the range of 3:1 to 10:1 and is preferably about 6:1. The holes are all 6 mm in diameter. Additional slots and round holes may be advantageously placed in the plate portions at convenient locations.

In operation, in the embodiment of FIGS. 1–3, and 8, a fastener means 32, such as a screw, "Elro" (TM) screw or bolt, is positioned through the slots 16 and 17. The fastener means is loosely held in a pre-drilled or pre-tapped hole. For example, screws through slots 16 and 17 are inserted into holes in a shelf board, partition or other panel 19, see FIG. 8. The term "panel" includes any substantially flat member such as a board, wall or partition. The outside face 40 is flush against panel 19 and the top face 41 is flush against another panel. Then the bracket 10 is moved, along the slots 16 and 17, to adjust the bracket relative to panel 19. At this time a second bracket may be installed on the same panel, if needed, and similarly adjusted.

The fastener means extending through the slots 16 and 17 are not fully tightened. The panel 19, loosely secured to the bracket 10, is mounted perpendicular to a support panel, for example, a wall, with a fastener means loosely connected through slot 14. The panel 19 is adjusted to be plumb or level or square to the support panel. The fastener means are now all fully tightened. The bracket may be further secured by driving additional fastener means through round throughholes 15a–15c and 18. If desired, the bracket may be readjusted by loosening the fastener means, moving the bracket or panel, and then re-tightening the fastener means. Similarly, the panels may be readily disassembled and reassembled.

The F-shaped bracket of FIGS. 4–7 is similarly installed. The space between the plate portions 23 and 21 is adapted to fit over the edge of a panel, such as a partition wall. Embodiments of the brackets are consequently made with that spacing being $\frac{5}{8}$", $\frac{3}{4}$", 1', 1$\frac{1}{8}$", 1$\frac{1}{4}$", 1$\frac{1}{2}$", etc., so as to fit panels of different widths.

Figure 9:
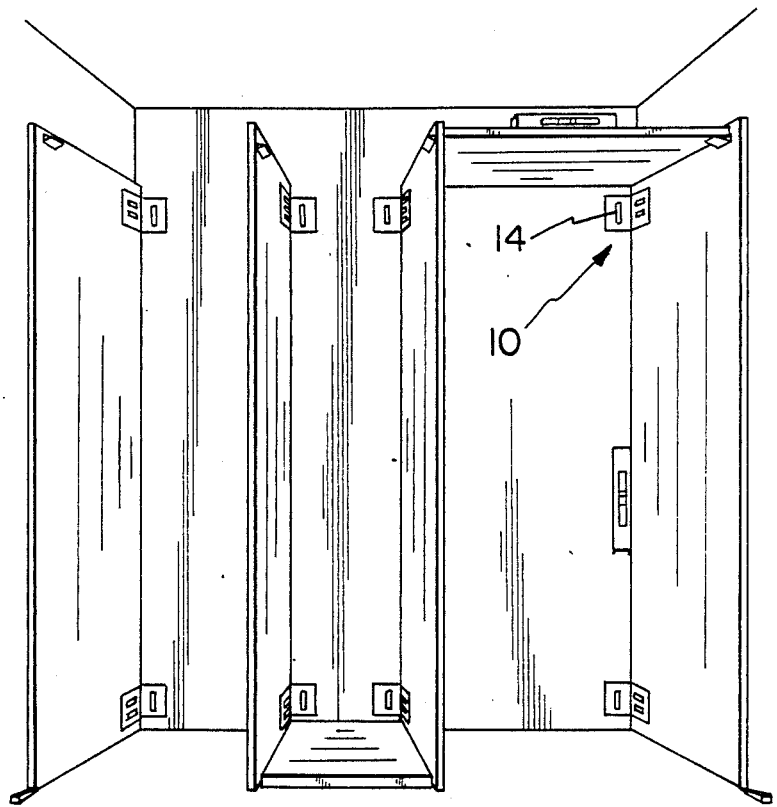
FIG. 9 is a schematic view showing the use of the first embodiment in a closet system.

A representative use of the brackets of this invention in a closet system is shown schematically in FIG. 9.

We claim:

1. An F-shaped support bracket formed as a one-piece unitary member comprising:
   (a) first and second plate portions, each being rectangular in shape and having at least one elongated hole therethrough, said first and second portions being parallel to each other and adapted to be fastened to a panel held between said first and second plate portions;
   (b) a third plate portion rectangular in shape having juncture lines with said first and second plate portions, said third plate portion having at least one elongated hole therethrough, being perpendicular to said first and second plate portions and being adapted to support a second panel;
   (c) wherein the direction of elongation of the holes in the first and second portions are perpendicular to said juncture lines, the direction of elongation of the hole in the third plate portion is parallel to said juncture line, and said elongated holes are adapted to have fastening means extending therethrough permitting the bracket to move relative to said fastening means for adjustment of the bracket relative to the panels prior to the fastening means being fully tightened.

2. A bracket as in claim 1 wherein a second elongated hole is through each of said first and second plate portions and is aligned parallel to said other elongated hole of the first and second plate portions.

3. A bracket as in claim 1 wherein said first and second plate portions are the same size and shape as each other and their holes are aligned.

4. A bracket as in claim 1 wherein the ratio of length to width of the elongated holes is in the range of 3:1 to 10.1.

5. A bracket as in claim 1 wherein the bracket is of sheet metal.

* * * * *